Feb. 22, 1949.  J. LOYCZ  2,462,757
COMBINED MIXER AND COOLER FOR DRINKS
Filed May 10, 1946
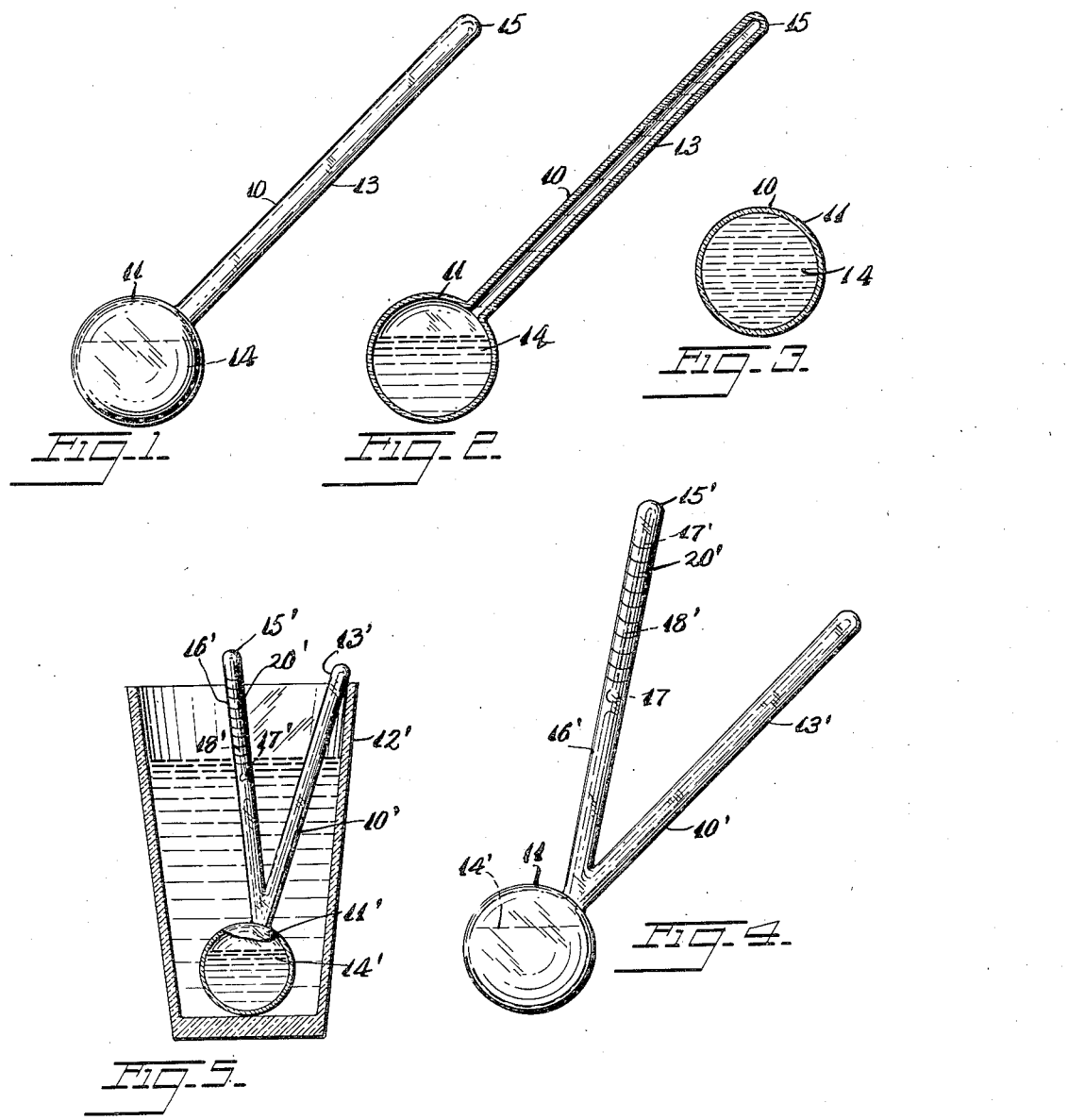
INVENTOR
JULIUS LOYCZ
BY
ATTORNEY Patented Feb. 22, 1949

2,462,757

UNITED STATES PATENT OFFICE 2,462,757

COMBINED MIXER AND COOLER FOR DRINKS

Julius Loycz, South Amboy, N. J.

Application May 10, 1946, Serial No. 668,955

3 Claims. (Cl. 62—1)

This invention relates to new and useful improvements in a combined mixer and cooler for drinks.

More particularly the invention proposes the construction of a combined mixer and cooler for drinks which should enable anyone to preserve the cool temperature of the drink for longer periods of time than has heretofore been possible. The new combined structure will permit ready cooling of freshly dispensed drinks outside of iceboxes, refrigerators or cold storage rooms. Use of the product of the present invention should enable one to mix and prepare cold drinks even at places which are quite distant from the nearest icebox. Not only will the new gadget be useful in the home and in commercial establishments dispensing soft or other drinks but it should prove extremely helpful in providing refreshing and cool beverages at picnics and other outdoor occasions.

In spite of these many advantages, the device of the new invention will be found extremely economical in cost and in operation. Moreover, it is easy to make either by hand or by using well known, readily available machinery and economical material. When made by machine, it is possible to prepare the new device in quantity at tremendous speed.

Even without considering the great simplicity, cheapness and ease of manufacture of the new device, it will appear that it has many other advantages such as ease of handling, small size, and great and persistent durabilities. Should it ever suffer any damage, it could easily be repaired or replacement could be made at very low cost.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure where similar numerals identify similar parts throughout the several views shown:

Fig. 1 is a front elevational view showing the device of the instant invention.

Fig. 2 is a vertical sectional view through the center of the device shown in Fig. 1.

Fig. 3 is a horizontal sectional view through line 3—3 of Fig. 1.

Fig. 4 is a front elevational view showing another embodiment of the present invention.

Fig. 5 is a vertical sectional view of a glass containing a beverage and the product of the invention.

In accordance with the embodiment of the invention illustrated in Figs. 1–3, a combined mixed and cooling device 10 for drinks is made utilizing a hollow bowl 11 of a diameter low enough to readily fit into the interior of a conventional beverage glass 12.

At one side of the bowl 11 a long and narrow hollow stem 13 is drawn. This stem 13 is left open for some time, a colored liquid 14 being injected therein as soon as the glass or other transparent material has recovered from the forming operation. The colored liquid 14 should fill most of the hollow bowl 13.

After standing long enough to permit the normal expansion and contraction of the liquid 14 and the transparent glasseous material, the stem 13 is completely sealed at its end 15 which is opposite hollow bowl 11. The product is now ready for use.

Usually quite a number of units of the device are used and are inserted in the cooling compartment of a refrigerator or icebox. The shape of the product permits considerable surface contact with the frozen environment. In view of this shape, the colored liquid 14 will soon become ice. This occurrence, of course, can be readily observed on the device.

The individual units are now removed from the freezer and are ready for use. They are now simply inserted in glasses, desired ingredients are added and the product of the invention is used to simultaneously stir and cool the beverage. Even inside the glass, the slow melting of the ice may be observed and another unit may be substituted whenever the freezing capacity of one combined cooler and stirrer is exhausted. Of course, it is readily possible to reuse the same unit by reentering it in an icebox and repeating the cycle, cooling beverages in the same or another container.

In accordance with the embodiment illustrated in Figs. 4 and 5 of the invention, a similar device having several advantages over the prior structure is made.

This construction involves two stems 13' and 16' emanating from bowl 11' at a slight angle. At a distance sufficient to effect satisfactory thermal separation from cooling bowl 11', the main body of the liquid 14', stem 16' houses the bulb 17' of a thermometer involving a liquid 18' which rapidly expands on heating in a narrow capillary tube 19' forming the upper part of stem 16'. Markings 20' are on the outside of the stem 16' providing an easy indication of whether the drink has reached recommended drinking temperature.

Of course this embodiment of the invention is used in a way similar to the method of use described earlier in this specification with the other embodiments of the invention. It should, however, be noted that the new device will give much more stirring action due to the convenient arrangement of stems and bowl and that the particular cooperating situation of the thermometer permits an accurate estimate of the actual temperature of the drink before a consumer tastes it.

In either embodiment the cooling effect is obtained without the often undesirable and sometimes unsanitary direct contact between melted ice and the drink which the melted ice often unduly dilutes. The color of the liquid in bowl and stem provides an attractive novelty effect which often can be enhanced by using a tinted or colored glasseous material for the construction of the product.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. As a new article of manufacture, a combined mixer and cooler for drinks comprising a hollow and thin wall structure involving a bowl and a narrow stem emanating therefrom, said bowl being of a size permitting ready insertion into a conventional drinking glass and a freezable liquid therein which is water and colored, and said stem being sealed, there being another stem emanating at a slight angle from the same point of said bowl, which in its upper part houses a thermometer.

2. As a new article of manufacture, a combined mixer and cooler for drinks comprising a hollow and thin wall structure involving a bowl and a narrow stem emanating therefrom, said bowl being of a size permitting ready insertion into a conventional drinking glass and a freezable liquid therein which is water and colored, and said stem being sealed, there being another stem emanating at a slight angle from the same point of said bowl, which in its upper part houses a thermometer, the bulb of which is far enough from said bowl and the main body of said liquid to effect thermal insulation therefrom.

3. As a new article of manufacture, a combined mixer and cooler for drinks comprising a hollow and thin wall structure involving a bowl and a narrow stem emanating therefrom, said bowl being of a size permitting ready insertion into a conventional drinking glass and a freezable liquid therein which is water and colored, and said stem being sealed, there being another stem emanating at a slight angle from the same point of said bowl, which in its upper part houses a thermometer, the bulb of which is far enough from said bowl and the main body of said liquid to effect thermal insulation therefrom, said combined structure also including markings on said second mentioned stem permitting ready recognition of the temperature of a liquid surrounding said structure by visual means.

JULIUS LOYCZ.

REFERENCES CITED

The following references are of record in the file of this patent:

UNITED STATES PATENTS

| Number | Name | Date |
|---|---|---|
| 2,120,201 | Fisk | June 7, 1938 |